Oct. 23, 1951     H. E. SCHLENZ     2,572,767
METHOD AND APPARATUS FOR DIGESTING GARBAGE AND SEWAGE SLUDGE
Filed Nov. 18, 1948     5 Sheets-Sheet 1
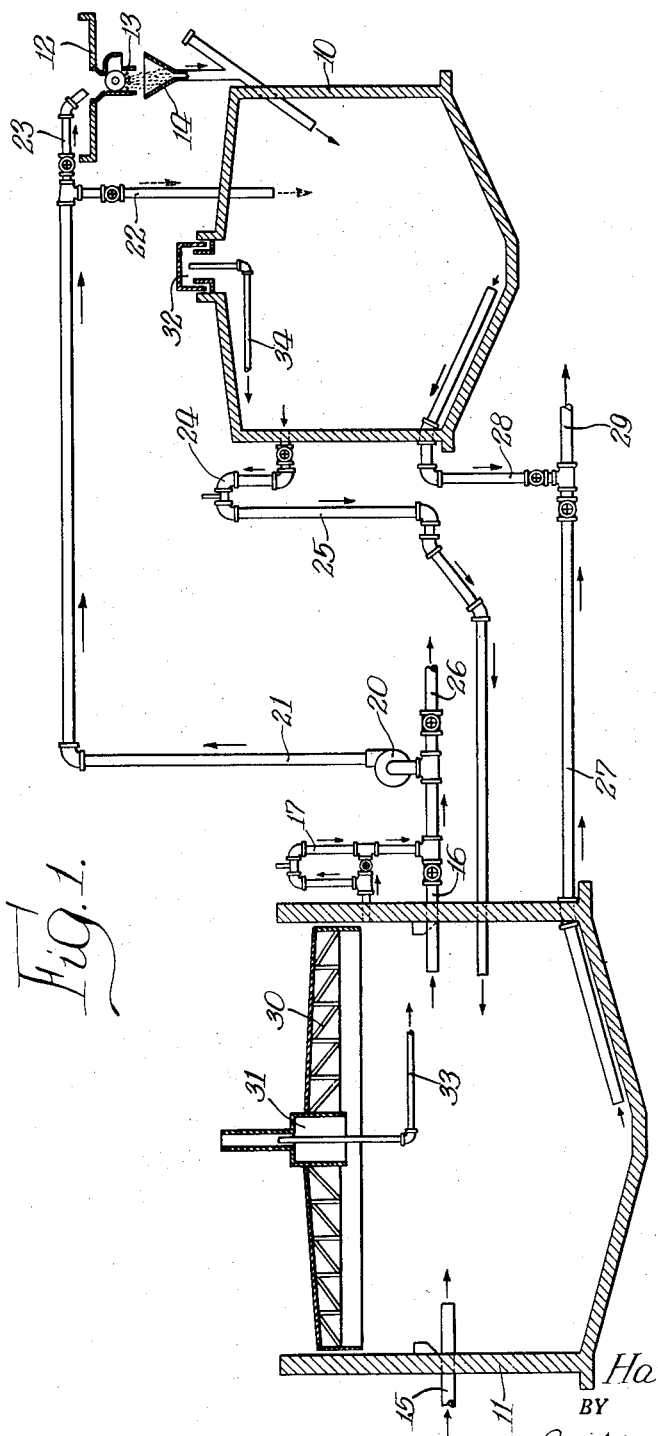
*INVENTOR.*
*Harry E. Schlenz,*
BY Oct. 23, 1951     H. E. SCHLENZ     2,572,767
METHOD AND APPARATUS FOR DIGESTING GARBAGE AND SEWAGE SLUDGE
Filed Nov. 18, 1948     5 Sheets-Sheet 3

INVENTOR.
Harry E. Schlenz,
BY
Attys.

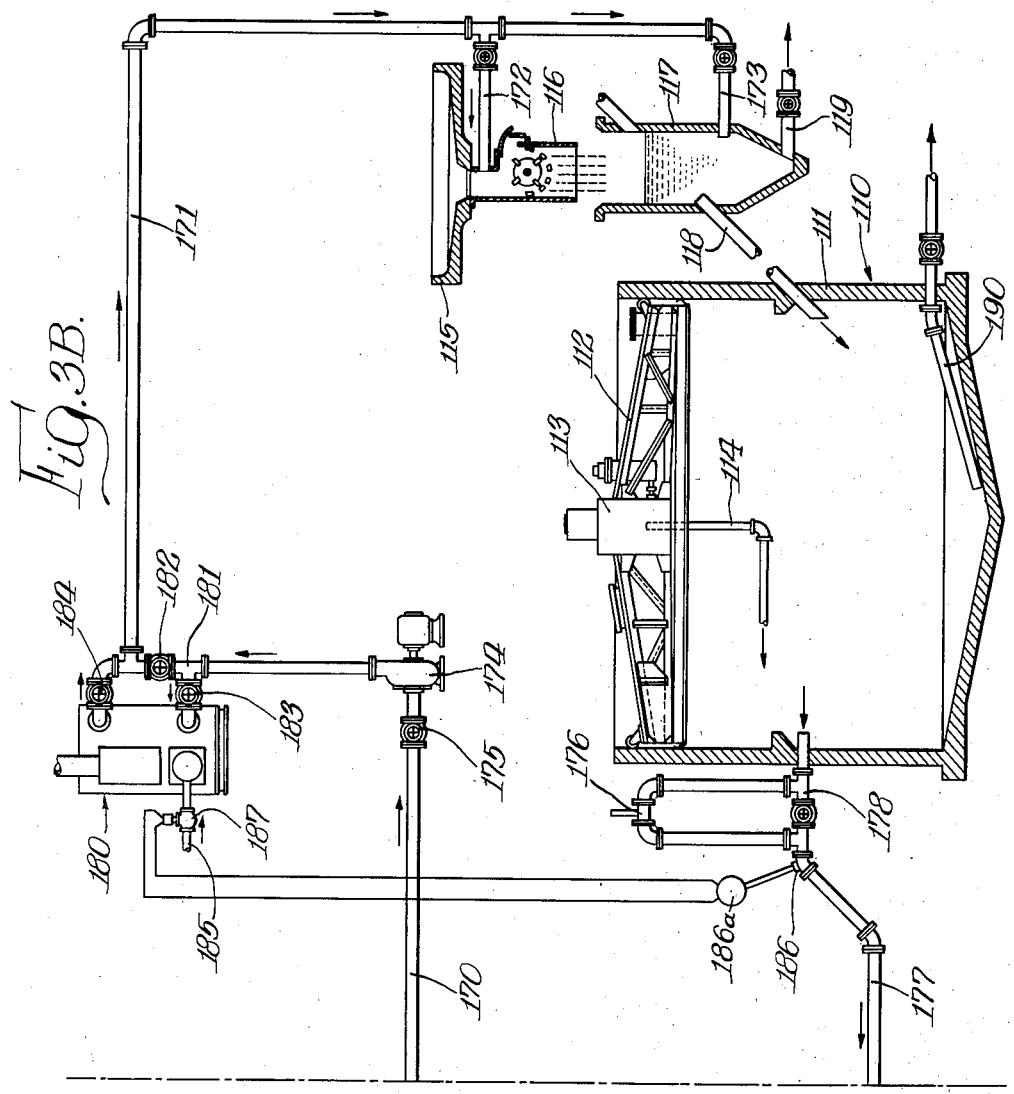

Oct. 23, 1951  H. E. SCHLENZ  2,572,767
METHOD AND APPARATUS FOR DIGESTING GARBAGE AND SEWAGE SLUDGE
Filed Nov. 18, 1948
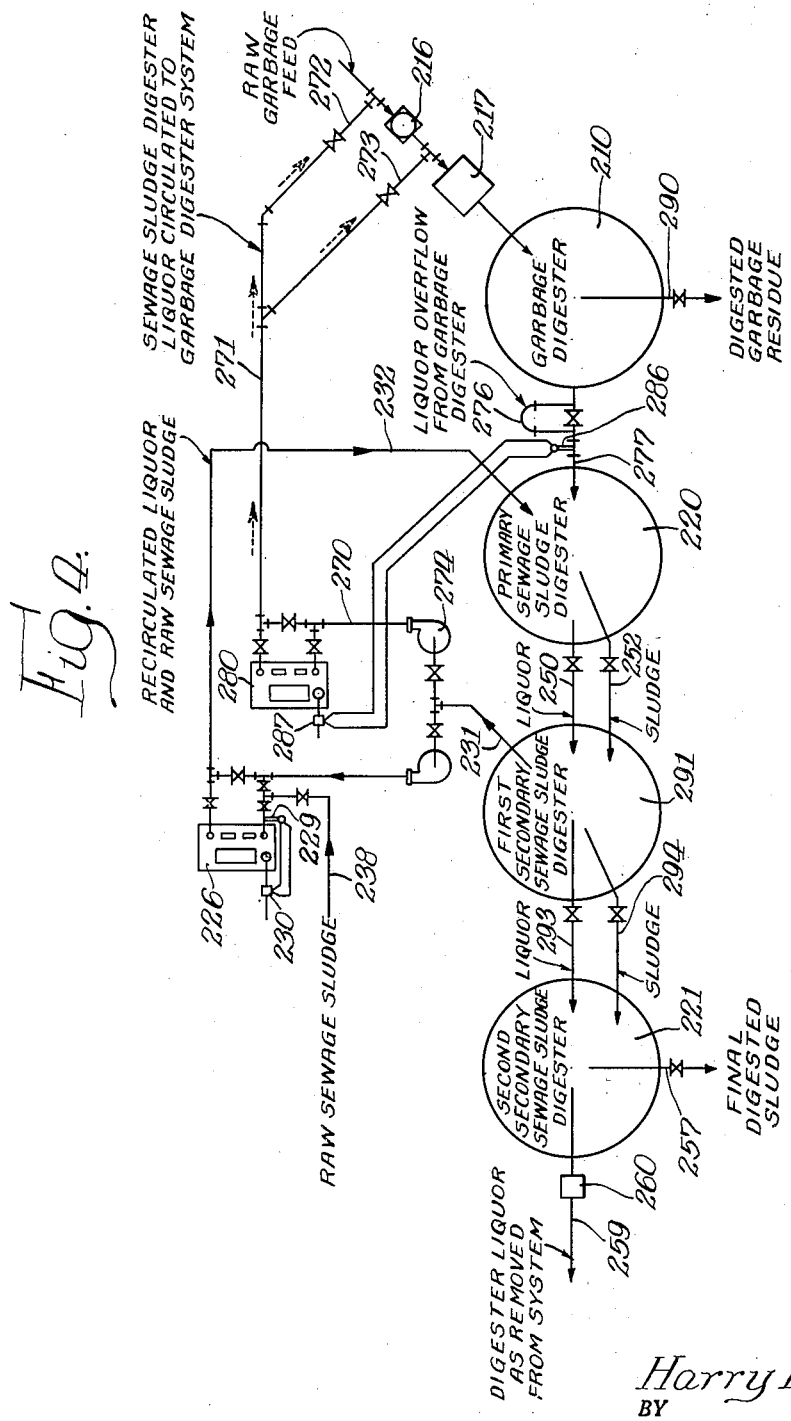
INVENTOR.
*Harry E. Schlenz,*
BY
*Fuller, Crowe & Beardsley*
Atty's.

Patented Oct. 23, 1951

2,572,767

UNITED STATES PATENT OFFICE 2,572,767

METHOD AND APPARATUS FOR DIGESTING GARBAGE AND SEWAGE SLUDGE

Harry E. Schlenz, Glencoe, Ill., assignor to Pacific Flush Tank Company, Chicago, Ill., a corporation of Illinois Application November 18, 1948, Serial No. 60,753

11 Claims. (Cl. 210—2)

1

The invention relates generally to the disposal of garbage or other generally similar digestible organic wastes and, more particularly, to a method of and apparatus for digesting by anaerobic decomposition, garbage or other generally similar digestible organic wastes containing non-digestible solid matter.

An object of the invention is to provide a novel method and apparatus for disposing of garbage or other generally similar digestible organic wastes containing non-digestible solid matter, by digestion, by which method and apparatus such wastes may be handled along with the disposal of sewage, with a minimum of capacity of apparatus and a minimum expense of operation.

Another object is to provide a novel method and apparatus of digesting, by anaerobic decomposition, garbage or other generally similar digestible organic wastes of a nature which, when allowed to decompose normally, decomposes by acid fermentation, by which method acid fermentation of the garbage or other wastes during the digestion process is prevented and anaerobic digestion is maintained.

A further object is to provide a novel method and apparatus for digesting garbage or other generally similar digestible organic wastes in which the amount of overflow or effluent liquor in the system in which the digestion is carried out is maintained at a minimum.

Still another object is to provide a novel method and apparatus for digesting garbage or generally similar digestible organic wastes which may be carried on in connection with the digestion of sewage sludge solids, utilizing the digester liquor evolved in the anaerobic digestion of the sewage sludge solids for effecting proper anaerobic decomposition of the waste, and which eliminates the necessity of adding water or other liquid from an outside source for grinding the garbage or other waste, preparatory to its digestion.

A still further object is to provide a novel method and apparatus for the digestion, in connection with the digestion of sewage sludge, of garbage or other organic wastes containing non-digestible solids such as fibrous material, bone, glass and metal, which non-digestible solids are prevented from entering the sewage sludge digestion system, thereby avoiding clogging of the pipes or valves of the sewage sludge digestion system.

It is also an object to provide a method and apparatus for digesting garbage or other digestible organic wastes containing non-digestible solids, in connection with the digestion of sewage sludge, without adversely affecting the sewage sludge digestion.

2

Another object is to provide a method and apparatus for digesting garbage or other digestible organic wastes containing non-digestible solids, wherein optimum anaerobic digestion of both the garbage and sewage sludge may be maintained.

A further object is to provide a method and apparatus for digesting garbage or other digestible organic wastes containing non-digestible solids, wherein at least a portion of the non-digestible solids may be settled out and removed from the system, prior to introduction of the garbage into the portion of the system in which garbage digestion is effected and without requiring the addition of water or other liquid from an outside source.

A further object is to provide a method and apparatus for digestion of garbage or other organic wastes containing non-digestible solid matter, in connection with the digestion of sewage sludge, which is highly efficient and may be operated with great economy and with a minimum of attention on the part of the operator.

Another object is to provide a method and apparatus for disposal of garbage or other digestible organic wastes containing non-digestible solid matter whereby such wastes may be disposed of along with sewage sludge in an existing sewage disposal system by a relative simple and inexpensive addition to such existing system, without adversely affecting the normal primary and secondary functioning of the sewage disposal system, and without greatly decreasing the effective capacity of such existing system for the disposal of sewage.

Another object is to provide a method and apparatus for digesting garbage or other digestible organic wastes containing non-digestible solid matter in connection with a sewage disposal system and wherein anaerobic digestion of the garbage or other wastes is maintained automatically even where the rate of delivery of garbage to the disposal system is not uniform and may vary widely during any predetermined period.

Another object is to provide a method and apparatus for anaerobic digestion of garbage or other generally similar digestible organic wastes containing non-digestible solid matter wherein the garbage is digested under digesting conditions similar to those in a sewage sludge digester in a simple and economical manner, and without the disadvantages and difficulties attendant upon introduction of the wastes into the sewage sludge digester.

Another object is to provide a method and apparatus for anaerobic digestion of garbage or other generally similar digestible organic wastes along with the digestion of sewage sludge and by which the digesting garbage, or other generally similar wastes, may be maintained at or around the optimum temperature for digestion in a simple and inexpensive manner.

Other objects and advantages will appear from the following description, taken in connection with the accompanying drawings, in which:

Figure 1 is a somewhat diagrammatic, vertical, cross-sectional view showing one form of apparatus embodying the invention;

Fig. 2 is a flow diagram illustrating a method and system in accordance with another embodiment of the invention;

Fig. 3B is a view in continuation of Fig. 3A and showing the remainder of the apparatus, a portion of which is shown in Fig. 3A; and Fig. 4 is a flow diagram indicating a method and system in accordance with a further embodiment of the invention.

Figure 3A:
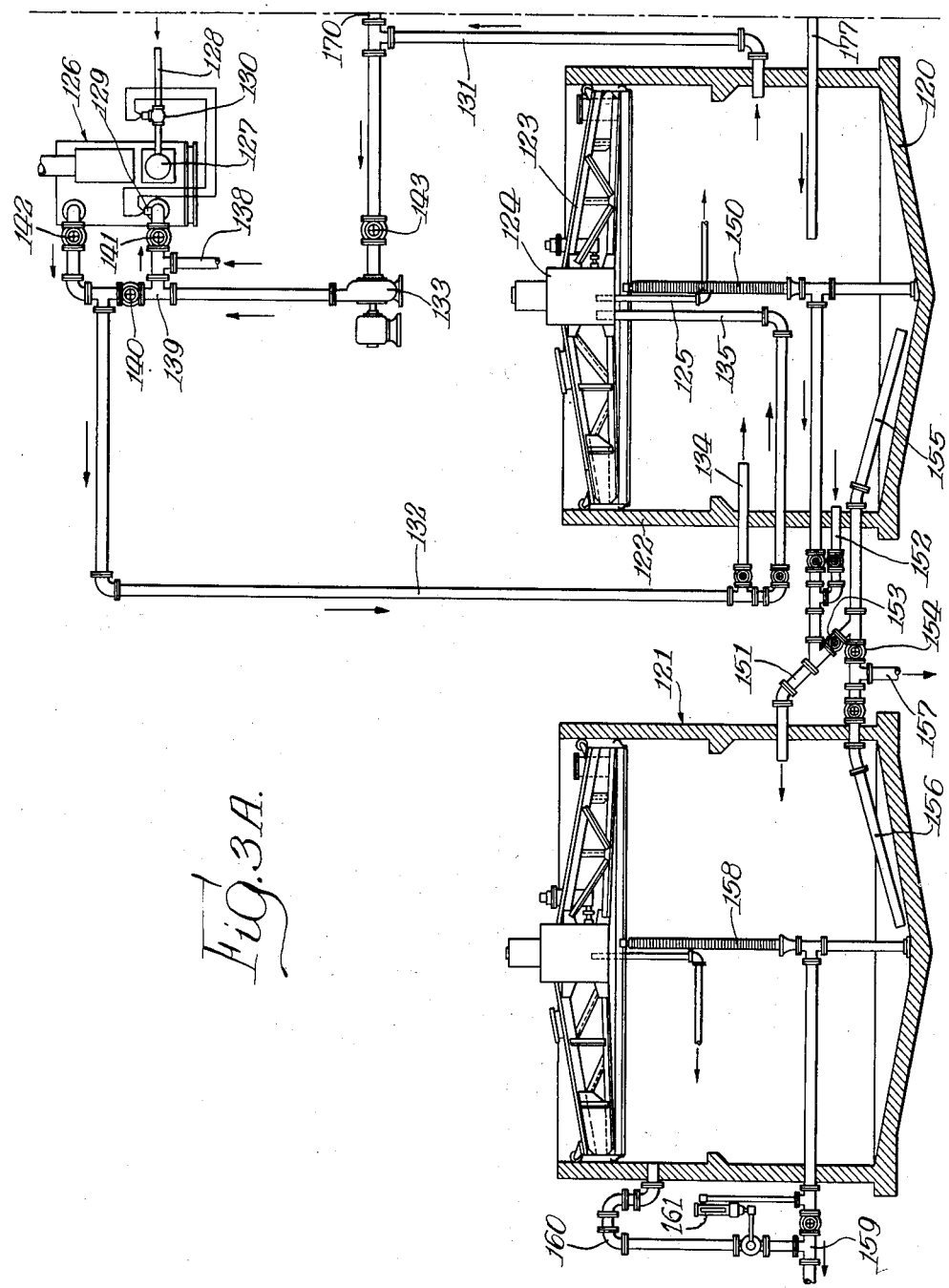
Fig. 3A is a somewhat diagrammatic view with certain of the parts shown in vertical cross section showing a portion of apparatus for carrying out the process in accordance with the flow diagram of Fig. 2.

The term "garbage" as used herein refers to organic waste from food products, from whatever source derived, which in decomposition tends, under normal conditions, to undergo acid fermentation, as distinguished from anaerobic digestion. Such material, furthermore, in its raw state, as received for disposal, consists of a large proportion of solids, as distinguished from raw, untreated sewage, which contains only a small percentage of solids, as will be understood by those skilled in the art. Garbage, therefore, is well adapted for digestion without the preliminary or primary treatments usually necessary prior to digestion of sewage sludge.

In the disposal of organic waste products such as garbage, attempts have heretofore been made to digest the garbage by a process in which the garbage was placed in a decomposing container without the introduction of any other matter except water. It was soon found, however, that such a process was impractical due to the fact that fermentation of an acid type took place under such circumstances, with the result that all digestion activity was stopped by the production of such acid. Furthermore, an odorous, sticky, non-drainable product was thereby obtained which was, to say the least, difficult to handle.

It was later discovered that organic matter such as garbage could be digested by anaerobic decomposition if it were mixed with suitable quantities of domestic sewage sludge solids in the same container or receptacle. Such mixture might be in a ratio of from 1 part of ground garbage to 1.36 parts of sewage sludge (on a dry weight, volatile solids basis) to 1.0 part of ground garbage to 0.7 part of sewage sludge. While such ratios are not necessarily limiting, it is known that digestion may be carried on at any point between such ratios, the preferred ratio being substantially 1:1. In average communities, it is found that the normal range of comparative weights of sewage sludge and garbage solids produced is in the ratio of approximately 1:1 so that the preferred ratio, from the standpoint of most effective digestion, is the same as the normal production of the constituents. It was also found that the time required for digestion of garbage and sewage solids produced is in the ratio of approximately 1:1 so that the preferred ratio, from the standpoint of most effective digestion, is the same as the normal production of the constituents. It was also found that the time required for digestion of garbage and sewage solids is substantially the same as for the digestion of sewage solids alone, namely, 15 to 30 days, as in established practice.

In prior attempts to effect digestion of a mixture of garbage solids with sewage sludge solids, the two have been mixed in the same container or receptacle. However, this has led to many serious problems which, from a practical standpoint, prohibited the use of such a process.

The principal problem arising is due to the non-digestible solids which garbage usually contains. It is accepted practice to remove large metal objects, large bones, large pieces of glass and other trash before the garbage is ground, but it is impossible to eliminate eggshells, small bones, etc., before grinding, and, in the process of grinding, such material is broken up and distributed throughout the garbage. Such material is of a heavy specific gravity and settles out of the liquids rather quickly, particularly in the pipes handling digested sludge. Thus, the pipes and valves of the system become clogged and impossible to use. Also, fibrous material present in garbage, cannery screenings or other generally similar organic wastes form mats which tend to clog the system. In addition, small bones of "sliver-like" form interlace themselves in a mat along with particles of eggshells and glass and other non-digestible solids and frequently completely block off entrances to withdrawal pipes to render the system completely inoperative unless constant attention is given to prevent such occurrences. But even with such constant attention the difficulty is present and the cost of the labor involved in preventing such occurrences renders the process impractical.

Grit chambers have been employed to settle out such heavy residue in an attempt to eliminate such objectionable material or grit before reaching the pipes and valves of the digestion system, but so much organic matter is settled out along with the grit, where it is attempted to remove all the grit, that further handling of such grit, other than mere removal, is required. In order to overcome the problems encountered in adding ground garbage solids directly to a sewage sludge digester, it has been the general practice to add the ground garbage solids to the raw sewage to be treated, whence it passes through grit chambers and then settling means wherein the garbage solids are partially settled out with the sewage solids. However, it is found that more than 25 per cent of the garbage solids added to the raw sewage passes out of the settling tank in the form of colloidal and dissolved constituents of the effluent. These constituents materially increase the Biochemical Oxygen Demand (B.O.D.) and consequently lessen the degree of treatment normally given to such effluent. If further treatment is provided for such effluent by means for effecting secondary oxidation, the load on such means is greatly increased, ranging in reported values from 11 to 100 per cent, with an average of about 43 per cent. Furthermore, there is a considerable increase in the floating solids and grease formation in the effluent, which is difficult to collect and transfer to the digestion means and which introduces a sight and odor nuisance.

A further difficulty is encountered when garbage is introduced directly into the sewage sludge digester because of the fact that, in the grinding of garbage, water must be added during such step. The quantity of water so added materially increases the quantity of supernatant liquor in the digester to such an extent that the handling of the overflow liquor becomes a problem. Further, such overflow liquor, which for a normal sewage digester contains 500 to 5000 p.p.m. (0.05 to 0.5 per cent) of suspended solids, will contain 20,000 to 25,000 p.p.m. (2.0 to 2.5 per cent) of suspended solids. Such heavy liquor, because of its organic content, results in an overloading of the secondary treatment processes normally provided therefor.

The present invention provides a method and apparatus for overcoming all of the foregoing difficulties, particularly, in larger capacity apparatus handling sewage sludge solids. In accordance with the present invention, the garbage, or other generally similar digestible organic wastes as, for example, cannery screenings (all such wastes being hereinafter, for convenience, designated as "garbage") is fed to a zone sealed against the admission of air for decomposition therein. Sewage sludge is fed to a zone separated and distinct from the garbage digestion zone and sealed against the admission of air for anaerobic decomposition of the sewage sludge therein. During the digestion of the garbage solids actively digesting material is continually passed from the sewage sludge digestion zone to the garbage digestion zone to maintain and continuously bring into contact with the garbage solids the environment of the sewage sludge digester. Thus, the garbage is maintained in a zone supplied with the active organisms derived as an incident to the digestion of the sewage sludge, with the garbage substantially segregated from the digesting sewage sludge. Preferably, this is accomplished by providing a separate container or digester to receive the garbage solids and into which digester liquor from the sewage sludge digester is continually introduced during the digestion process. Overflow liquor from the garbage digester is returned to the sewage sludge digester.

Thus, the non-digestible material in the garbage is confined to and substantially completely segregated in the garbage digester and cannot find its way to the sewage digester or other parts of the system. The problem, then, of clogging of drains, piping and other parts of the system is thereby materially reduced and confined to predetermined points in the system and does not extend throughout the entire system. The non-digestible solid matter in the garbage digester has a relatively heavy specific gravity and, in addition, it is not gas-lifted as are the solid particles which are undergoing digestion and thus the former sinks rapidly to the bottom of the digester. Moreover, the separation of such matter from the digesting solids is aided by the "rolling" action of the digesting particles. The portion of the garbage which finds its way to the sewage digester, therefore, is the light, nongritty, solid matter which becomes decomposed during the process and will form no undesirable residue in the process. Hence, the sewage treatment process is not disturbed. The non-digestible material remaining in the garbage digester may be removed periodically.

The tendency of the garbage toward acid fermentation is overcome by the stabilizing effect of the digester liquor withdrawn from the sewage digester and introduced into the garbage digester so that the anaerobic digestion action in the garbage digester will continue until complete. The continual addition to the garbage of actively digesting material evolved from the anaerobic digestion of domestic sewage sludge maintains an environment which is favorable to the anaerobic digestion of the garbage. Such added actively digesting material not only supplies all of the various organisms necessary to digest the different materials found in garbage but, such added material being alkaline, provides a buffering action which prevents acid fermentation and maintains the anaerobic digestion of the garbage. The rapid digestion of the garbage solids is effected due to the continual contact with actively digesting material obtained from the more stable sewage sludge digestion, the beneficial organisms from the sewage sludge digestion being continually supplied to the garbage to support throughout the process the anaerobic decomposition.

It is believed that certain methane-producing organisms found in digesting sewage sludge are responsible for the anaerobic digestion thereof and that the continual supply of such organisms to the garbage, in accordance with my invention, maintain the anaerobic digestion thereof and overcomes the tendency of the garbage to undergo acid fermentation. In any event, the present invention provides for maintaining a digesting action in the garbage digestion zone which is similar to that in the sewage digestion zone, with the methane-producing organisms from the sewage sludge digestion being active in the digestion of the garbage.

Liquor withdrawn from the sewage sludge digester is continually supplied to the garbage in the garbage digestion zone at a rate sufficient to maintain anaerobic digestion of the garbage and preferably optimum digestion. The necessary rate may vary considerably, dependent upon various factors such as the rate of supply of garbage, the nature of the garbage, the external temperature, and others. By way of example, but not limitation, it has been found that where average domestic garbage is to be digested in connection with average domestic sewage sludge, excellent results may be obtained by effecting a circulation of liquor from the sewage sludge digester to the garbage digester and back to the sewage sludge digester sufficient to displace an amount of material equal to approximately one-third the volumetric capacity of the garbage digester per 24 hours. It will be appreciated that a high rate of circulation may result in a more rapid digestion of the garbage, but the foregoing rate has been found to be economically feasible, taking into consideration such factors as the cost of pumping and the control of acidity of the contents of the garbage digester.

Excess liquor or effluent from the garbage digester is returned to the sewage sludge digester for conditioning prior to delivery to a point of disposal. Such overflow or excess digester liquor is high in organic matter, with colloidal and dissolved solids and, consequently, has a high B. O. D. The further digestion of organic matter in such liquor in the sewage sludge digestion zone and the consequent reduction of strength of the liquor permits such liquor to be disposed of in the same manner as and along with the excess liquor or effluent evolved in the sewage sludge digester. Thus, a minimum of secondary treatment is necessary for the withdrawn effluent.

The garbage, before being introduced to the garbage digester, is ground to reduce the size of the solid particles to a convenient size for digestion thereof. Preferably, the garbage is ground as fine as practicable since the smaller the particles are which are introduced into the garbage digestion zone the more rapidly will the digestion proceed. However, excellent results have been obtained by grinding the garbage as fine as possible in a commercially available grinder as, for example, in a hammer mill type of grinder. The liquid necessary to facilitate such grinding operation is provided by passing digester liquor from the sewage sludge digester and, therefore, it is unnecessary to add water or other liquid from an outside source, with the result that the only liquor introduced into the system is that resulting from the introduction of the sewage sludge and the garbage into the system and the digestion of such materials in the system. Thus, the total quantity of liquid in the system is held to a minimum. The introduction of digester liquor into the garbage in the grinding step attains the advantage of intimately mixing the liquor with the ground garbage prior to introduction of the latter into the garbage digester and thus distributes actively digesting material throughout the ground garbage to initiate digestion thereof at the earliest practicable point in the process. Moreover, the digester liquor withdrawn from the sewage sludge digester is warm and preheats the garbage so that its temperature approaches that of the digesting mass of garbage in the garbage digester, with a minimum of upsetting of the digestion within the garbage digester.

The ground and moistened garbage preferably is settled prior to introduction into the garbage digester in order to settle out, insofar as possible, heavy, non-digestible materials, thereby minimizing the quantity of such materials passing into the garbage digester. For this purpose additional digester liquor withdrawn from the sewage sludge digester is introduced into the ground garbage prior to the latter being passed to the garbage digester.

It has been found that the organisms responsible for the anaerobic digestion of sewage sludge are most effective where the temperature of the digesting sewage sludge is maintained at a certain predetermined value. While sewage sludge may be digested at temperatures of from around 85° F. to around 100° F., or even more, optimum digestion takes place at around 95° F., under most conditions. However, it has been found further that while these organisms will digest sewage sludge over a relatively wide temperature range, they are very sensitive to rapid changes in temperature and a temperature change of the digesting sewage sludge of even one or two degrees will sharply inhibit the action of the organisms and slow the digestion process until the organisms become accustomed to the changed temperature. In a similar manner, these organisms which are also employed in the present invention for effecting the anaerobic digestion of the garbage are likewise sensitive to changes in temperature in the digesting garbage mass. Accordingly, the present invention provides for maintaining the temperature of the digesting sewage sludge and the digesting garbage at as uniform a value as is practicable and as close as practicable to the optimum temperature of digestion under the conditions in any particular case.

In some cases, the optimum digestion temperature may be maintained in the garbage digester without the use of supplemental heating means supplying heat to the garbage digester, since sufficient heat may be supplied to the garbage digester by circulation of the digester liquor from the sewage sludge digester. However, in other cases, as, for example, where the garbage digester is located a considerable distance from the sewage sludge digester, or where low atmospheric temperatures prevail, the desired temperature is maintained in the garbage digester by supplying additional heat to the digester liquor withdrawn from the sewage sludge digester prior to introducing such liquor into the garbage digester.

In Fig. 1 of the drawings I have illustrated somewhat diagrammatically one form of system by which the process may be readily carried out. Such a system comprises a tank or receptacle 10 which is substantially sealed against the admission of air and in which anaerobic digestion of the garbage takes place, which tank, therefore, constitutes a garbage digester defining a garbage digestion zone. The garbage digester 10 may be placed adjacent a sewage sludge digester 11 which may be of any suitable known construction and is suitably connected thereto as hereinafter explained.

Garbage, after having been dumped, is carried to a sorting floor 12 as by a conveyor (not shown) where large objects such as metal pieces, large bones, or glass may be removed. From the sorting floor 12 the garbage is passed through a grinder 13 of suitable known construction for reducing the garbage solids to sufficiently small sized particles to permit digestion at a desirable rate. The garbage is discharged from the grinder into the tank 10 through a charging inlet 14.

The sewage sludge digester 11 is sealed against the admission of air and defines a digestion zone for anaerobic digestion of sewage sludge. The sewage sludge digester 11 is provided with an inlet conduit or pipe 15 through which the sludge settled out of raw sewage is delivered to the digester. Digester liquor (sometimes also known in the art as "supernatant liquor" or "liquor of digestion") which comprises actively digesting material containing active seeding organisms is withdrawn from the sewage sludge digester 11 through a withdrawal conduit 16 or through an overflow control device 17, both of which lead from the digester 11 at the level of the digester liquor therein. The flow from the conduit 16 or overflow device 17 is then forced by a circulating pump 20 through a conduit 21 to a point adjacent the garbage digester 10. While the contents of the sewage sludge digester 11 may be sufficiently heated by the digestion process to maintain the digestion temperature, heat may be supplied thereto, where needed, by any suitable known heating means (not shown) in the digester, or by the external heating means hereinafter described in connection with a second embodiment of my invention.

From the conduit 21, digester liquor withdrawn from the sewage sludge digester 11 may be introduced into the garbage digester 10 through two paths, selectively or simultaneously. It may be directly introduced into the garbage digester 10 through a discharge pipe 22 to be mixed in the digester with the ground garbage therein. To provide the necessary liquid for grinding of the garbage, without necessitating the addition of water or other liquid from outside the system, a branch discharge pipe 23 is provided which discharges a controlled quantity of the digester liquor into the grinder 13. Such quantity is intimately mixed with the ground garbage and aids in starting the decomposition process as the garbage passes into the digester. Moreover, the digester liquor, being substantially at a temperature of the contents of the sewage sludge digester, heats the garbage prior to introduction of the latter into the garbage digester. Digester liquor is continually supplied from the sewage sludge digester 11 to the garbage digester 10 at a rate sufficient to maintain anaerobic digestion of the garbage undergoing digestion.

The digester liquor within the garbage digester is maintained at a desired level by an overflow control device 24 of known form which permits the withdrawal of the excess liquor or effluent and the return thereof to the sewage sludge digester through a conduit 25. Thus, there is continual transfer of liquor of digestion from the sewage sludge digester 11 to the garbage digester 10 and return thereof to the sewage sludge digester. Such continual transfer of digester liquor to the garbage digester 10 maintains the supply of active organisms sufficient to effect anaerobic decomposition within the garbage digester and at the same time avoids an excess of liquid in the system as a whole since no water from an outside source need be introduced during the process. However, should there be an excess of overflow liquor in the system, such excess may be discharged from the conduit 16 through a discharge pipe 26 for such further treatment as may be desirable, it being noted that such excess is withdrawn only from the sewage sludge digester 11 and not from the garbage digester 10. Thus, a minimum of secondary treatment will be required for the withdrawal of overflow since the colloidal matter contained in the overflow will be at a minimum.

Upon the completion of the digestion process, the digested sludge may be removed from the sewage sludge digester 11 through a discharge conduit 27, and from the garbage digester 10 through a conduit 28, the conduits 27 and 28 preferably being connected and carrying the digested sludge to a point of disposal through a conduit indicated at 29. The non-digestible solids from the garbage are confined to the digester 10 and may be readily removed without having to clear out the piping of the system for this purpose and without disturbing the sewage sludge digestion process where formerly, when garbage was digested in the sewage sludge digester, it was necessary to halt operation at times to clear out the system. The discharge conduit 28 leading from the garbage digester 10 preferably is made sufficiently large to minimize clogging by the non-digestible residue and preferably back-flushing means (not shown) is provided to clear such conduit, should it become clogged.

It has been found that a substantial quantity of gas is generated in the process above described, both in the sewage sludge digester 11 and in the garbage digester 10. Such gas is found to be produced in quantities of from 10 to 14 cubic feet per pound of volatile solids digested and has a methane content of 60 per cent to 70 per cent. This gas is valuable for generation of power and for heating purposes and, for that reason, means are provided for collecting the gas both in the sewage sludge digester and the garbage digester. Thus, the sewage sludge digester cover 30 has a gas collecting dome 31, while the garbage digester 10 may be provided with a gas collecting dome 32, the gas collected in the two domes 31 and 32 being piped through gas lines 33 and 34 to a convenient point of use or storage (not shown).

Various modifications in and additions to the method and apparatus above described may be made within the scope of my invention. In certain installations and particularly those which are located in relatively cold climates or where the garbage digester is located at a substantial distance from the sewage sludge digester, I have found it desirable to heat the digester liquor transferred from the sewage sludge digestion zone to the garbage digestion zone in order to insure that the temperature of the digesting material in the garbage digestion zone is maintained at the optimum for anaerobic digestion. Moreover, the raw garbage may be introduced into the garbage digester at such low temperatures and in such large quantities that the addition thereto of digester liquor at or slightly below the temperatures of the digesting material in the sewage sludge digester, which temperature of the added garbage may be insufficient to provide desired digestion conditions in the garbage digester. In such cases greater heating of the raw garbage may be desirable than is possible using liquor at the temperature of that withdrawn from the sewage sludge digester.

In addition, I have found that excellent results may be obtained by digesting the sewage sludge in a digestion zone comprising two or more stages, thereby obtaining an increase in efficiency in the sewage sludge digestion portion of the system, with a resulting increase in overall efficiency and also assuring the production of high quality end products for disposal.

I have also found that improved results may be obtained in many cases by subjecting the ground and moistened garbage to a settling operation, prior to introduction into the garbage digester, utilizing digester liquor from the sewage sludge digester for settling out of the garbage at least a portion of the non-digestible solids contained in the garbage, thereby reducing the amount of non-digestible material introduced into the garbage and reducing the tendency to clog the system. It will be understood, of course, that the foregoing features may be embodied in a system separately, or in various combinations.

A system, generally similar to the previously described system but embodying, in addition, the foregoing features is illustrated by the flow sheet of Fig. 2, and the apparatus corresponding thereto is diagrammatically shown in Figs. 3A and 3B read together. A garbage digester 110 (Fig. 3B) is provided which may be generally similar in construction to a known type of sewage sludge digester and includes a tank 111 closed by a cover 112 sealing the digester against the admission of air to provide a garbage digestion zone for anaerobic digestion of the contents thereof. The cover 112, as in the case of the cover 30, is supported by the contents of the digester and, hence, moves up and down to permit the volumetric capacity of the digester to accommodate itself to the volume of the contents. The cover 112 has a gas collecting dome 113 and a gas line 114 leading therefrom to a point of use or storage.

A sorting floor 115 is provided adjacent the garbage digester 110, and discharges into a grinder 116, which, in turn, discharges into a grit separation basin or settling tank 117, in which the ground and moistened garbage is subjected to a settling operation, as hereinafter more fully described. The garbage is passed from the grit separation basin 117, into an inlet conduit 118 by which it is delivered into the garbage digester 110, a discharge outlet 119 being provided for removing the settled residue from the basin 117. The residue removed from the basin 117 may be passed to a point of ultimate disposal or, if it contains substantial quantities of organic material, it preferably is returned to the raw sewage flow ahead of the usual grit removal means in the sewage treatment system where the organic materials are washed out and treated with the raw sewage.

The sewage digestion portion of the system (Fig. 3A) preferably includes a plurality of sewage sludge digesters and, in the present embodiment, includes a primary sewage sludge digester 120 and a secondary sewage sludge digester 121 suitably connected together and to the other elements of the system, as hereinafter explained. The digesters 120 and 121 may be of known construction and, preferably, are generally similar except in respect to the conduits connected thereto. The digester 120 includes a tank 122 having a cover 123 provided with a gas collecting dome 124 and a gas withdrawal pipe 125, all of which may be similar to the corresponding portions of the garbage digester 110.

As stated above, a small change in temperature in the digesting sewage sludge will greatly slow the digestion process. Thus cooling the digesting sewage sludge by the introduction of cold, raw sludge, or non-uniform heating of the digester contents as by the use of heating coils with the digester, as in prior practice may markedly decrease the efficiency of the process. Moreover, the use of heating coils in the digester is further undesirable for reasons pointed out in my U. S. Patent No. 2,516,076 granted July 18, 1950, for Method of Digesting Sewage Sludge or Trades Wastes. I prefer, therefore, to withdraw a portion of the digesting material (digester liquor) from the sewage sludge digester and circulate such withdrawn material through heating means located externally of the digester and then return such heated material to the digester, as disclosed in my aforesaid copending application. Thus, the contents of the sewage sludge digester may be readily maintained at a substantially uniform temperature and at the optimum temperature for digestion.

To this end a heater and heat exchanger unit 126 (hereinafter called a "heater") is provided externally of the digester 120 and through which digester liquor withdrawn from the digester 120 is circulated. I prefer to employ a heater such as disclosed in my copending application Serial No. 673,659, filed May 31, 1946, for Apparatus for Heating Materials. Briefly, the heater 126 includes a water bath (not shown) containing a coil or coils (not shown) through which the withdrawn digester liquor is circulated out of contact with but in heat exchange relation to the water in the water bath. The water bath is maintained at the desired temperature by a burner 127 such as disclosed in my aforesaid application Serial No. 673,659, suitably supplied with fuel, preferably gas evolved from the digestion in the garbage digester 110 or either of the sewage sludge digesters 120 and 121 or all of them, utilized to the extent of the availability thereof. Such gas is supplied to the heater through a fuel supply line 128 connected to one or more of the gas pipes leading from the digesters or to a point of storage (not shown) of the gas. The heater 126 is operated to maintain the desired temperature in the water bath, by a suitable control system as, for example, that disclosed in my above mentioned application Serial No. 673,659, which system includes a thermostatic bulb 129 which may be disposed in the inlet portion of the coil or in the water bath, and which controls a solenoid-actuated gas supply valve 130 in accordance with the temperature of the material passing into the coil to supply fuel when heat is required, and to cut off the supply of fuel when heat is not required. As explained in my copending application Serial No. 673,659, the burner may be supplied with a supplemental source of fuel, such as oil, in the event the gas available in the system is insufficient.

Digesting material from the sewage sludge digester 120 is circulated through the heater by a withdrawal conduit 131 leading from the digester 120 at the level of the digesting material therein and connected to the inlet side of the coil, and a return conduit 132 connected to the outlet side of the coil and leading back to the digester 120. The withdrawn digester liquor is circulated through the conduits 131 and 132 by a recirculation pump 133, the velocity of the liquor through the coil preferably being such as to insure turbulent flow in the coil, as explained more fully in my U. S. Patent No. 2,516,076. The return conduit 132 discharges into the digester 120 through valved return outlets 134 and 135, whereby the material may be returned, selectively or simultaneously, directly into the digesting mass in the digester 120 or over the scum which forms on the top of the digesting mass in order to soften and dissipate the scum, as explained in my aforesaid U. S. Patent 2,516,076.

As more fully explained in my above-mentioned U. S. Patent No. 2,516,076, sludge settled out from raw sewage as in a settling tank (not shown) preferably is heated prior to introduction into the sewage sludge digester 120 and this preferably is accomplished by passing such raw sewage sludge through the heater 126. Also, as explained in said application, I have found it preferable to mix the incoming raw sewage with digesting material withdrawn from digester 120 to provide initial seeding of the raw sewage sludge. To the foregoing ends I provide an inlet conduit 138 connected to the withdrawal conduit 131 ahead of the heater 126, whereby raw sewage sludge may be passed through the heater 126 along with the circulated digester liquor.

A heater by-pass conduit 139 having a control valve 140 therein is provided which connects the withdrawal conduit 131 and the return conduit 132 to permit circulating liquor withdrawn from the digester 120 or raw sewage sludge, or both, to be conducted past the heater 126 without passing through the heater coil. Valves 141 and 142 are provided for closing the flow through the heater coil. In addition, a valve 143 is provided in the conduit 131 for a purpose which will hereinafter appear. Accordingly, it will be seen that the apparatus may be operated in various ways, several being explained in my aforesaid application Serial No. 567,408. Thus, digesting liquor may be withdrawn from the digester 120 and returned, without heating, to the digester, such liquor being discharged over the scum, or digesting liquor may be circulated through the heater, or raw sludge may be introduced into the system, with or without heating, and with or without admixture with circulated liquor. Moreover, the material introduced into the digester 120 through the conduit 132 may be discharged either below or above the scum in the digester, or at both points simultaneously. Preferably, however, the raw sewage sludge is admixed with withdrawn digester contents and the mixture returned to the digester, and in most instances heating of the mixture is desirable; also, it is usually desirable to discharge at least a portion of the heated returned material over the scum.

The secondary sewage sludge digester 121 is connected to the primary digester 120 to permit the transfer thereto of both the best digested sludge and the best liquor, for further digestion of the sludge in the secondary digester. To this end a liquor withdrawal device or supernatant selector device 150 is provided and I prefer to employ a device such as disclosed in U. S. Patent to William M. Piatt No. 2,409,585, dated October 15, 1946, for Supernatant Selector Device for Sludge Digestion Tanks for withdrawing the clearest liquor from the digester. The supernatant selector 150 is connected by a valved transfer conduit 151 leading into the secondary digester 121 preferably at the level of the digester liquor therein. A valved by-pass conduit 152 may be provided for passing digesting material from the primary digester 120 to the secondary digester 121 where such operation is desired. A sludge withdrawal conduit 155 leads from the primary digester 120 adjacent the bottom thereof for withdrawing the best digested sludge and is connected to the transfer conduit 151 for passing such sludge to the secondary digester 121.

A sludge withdrawal conduit 156, leading from the bottom portion of the secondary digester 121, is provided for withdrawing sludge which is substantially completely digested and this conduit is connected to a discharge conduit 157 for conducting the digesting sludge to a point of disposal. The sludge withdrawal conduit 155 may be connected to the discharge conduit 157 for discharging digested sludge directly from the primary digester 120 instead of transferring it into the secondary digester 121, valves 154 and 153 being provided for such purpose.

A supernatant selector device 158, which may be similar to the device 150, is provided for withdrawing the clearest liquor from the secondary digester 121, and is connected to a discharge conduit 159, leading to a point of disposal. An overflow 161 and a rate-of-withdrawal controller 160 of known form may be provided for permitting a controlled outflow of liquor from the secondary digester 121.

Digester liquor from the primary sewage sludge digester 120 is supplied to the garbage digester 110 through a conduit 170 which preferably is connected to the withdrawal conduit 131 and to an inlet conduit 171 having a valved branch 172 discharging into the garbage being supplied to the grinder 116 and a valved branch 173 discharging into the grit separation basin 117. Circulation of digester liquor in the conduits 170 and 171 is effected preferably continually by a circulation pump 174. A valve 175 is provided for a purpose which will hereinafter appear. The digester liquor withdrawn from the sewage sludge digester and circulated through the conduits 170 and 171, and the heater 180, preferably is circulated at a velocity which will insure turbulent flow through the heater coil. Digester liquor withdrawn from the sewage sludge digester may be passed into the garbage digester, without being mixed with the garbage being ground, or without passing through the grit settling basin, a direct connection (not shown) being provided between the conduit 171 and the garbage digester, in a manner generally similar to the conduit 22 above described.

Excess liquor or effluent from the garbage digester 110 is returned to the sewage sludge digester 120 for further treatment prior to passing such liquor to a point of disposal. Such liquor is returned through an overflow control device 176 of known form leading from the garbage digester 110 at the level of the digester liquor therein and connected to a return conduit 177 leading to the sewage sludge digester 120. The overflow control device 176 maintains the desired level of the contents in the digester 110, a valved by-pass 178 being provided for permitting additional withdrawal, if desired.

The effluent from the garbage digester is returned to the sewage sludge digester, preferably at a level somewhat below the level of and at a distance from the withdrawal outlet leading from the sewage sludge digester, so that such returned effluent will not be immediately withdrawn from the sewage sludge digester and returned to the garbage digester, or discharged to a point of disposal, but is admixed with the material undergoing digestion in the sewage sludge digester and is further conditioned before being withdrawn.

Digested garbage residue may be withdrawn through a valved discharge outlet 190 leading from the bottom portion of the garbage digester 110.

As above stated, it may be desirable, under certain conditions, to heat the digester liquor which is withdrawn from the sewage sludge digester and introduced into the garbage digester 110 sufficiently so that its temperature is sufficient to maintain the temperature in the garbage digester 110 at the optimum temperature for digestion. For example, where the system is located in cold climates, or where the garbage digester is located at a substantial distance from the sewage sludge digestion, or where substantial quantities of cold raw garbage require disposal, such additional, externally supplied heat may be necessary. To this end a heater 180 is provided which may be similar to the heater 126 above described. The heater 180 is connected to the conduits 170 and 171 whereby the digester liquor passing from the sewage sludge digester 120 to the garbage digester 110 may be circulated through the heater. However, a by-pass conduit 181 having a valve 182 is provided (similarly to the by-pass 139) for passing the digester liquor around the coil of the heater to permit cleaning the coil without interrupting the operation. Also, the by-pass may be used where heating is not required at any particular time, valves 183 and 184 being provided for closing off the flow through the coil when the by-pass valve 184 is open. The heater 180 preferably is supplied with gas through a fuel supply pipe 185 connected to one or more of the gas lines leading from one or more of the digesters for utilizing gas evolved in the digestion process. The firing of the heater 180 preferably is controlled in accordance with the temperature of the contents of the garbage digester 110 in a manner generally similar to that disclosed in my copending application, Serial No. 673,659. This, conveniently, may be accomplished by inserting a thermostatic bulb 186 in the liquor overflow line 177 from the garbage digester 110. The thermostatic bulb 186 is connected to a temperature switch 186a which may be set to close a circuit when the temperature of the liquid passing the thermostatic bulb 186 in line 177 is less than the temperature set as the optimum temperature for the contents of the garbage digester 110 undergoing digestion. The thermostatic switch 186a is connected by an electrical circuit to control the operation of a solenoid or motor operated gas valve 187 in the fuel supply line 185 to allow gas fuel to be burned in the heater 180 to impart heat to the material being circulated through coils in the heater 180 to raise the temperature of the material passing through line 171, hence imparting the necessary additional heat to the contents of garbage digester 110 until the overflow from said garbage digester in passing thermostatic bulb 186 is of sufficient temperature to satisfy the temperature setting of thermostatic switch 186a and thus shut off the fuel supply by causing the gas valve 187 to close.

In the operation of the system illustrated in Figs. 2, 3A and 3B, garbage is passed from the sorting floor to the garbage grinder 116 where it is ground, utilizing digester liquor withdrawn from the sewage sludge digester 120 through the conduit 131, the conduit 170 and the conduit 171, such liquor being heated where necessary to the desired temperature by passing it through the heater 180. The heated digester liquor introduced into the garbage in the grinder during grinding of the garbage serves both as a liquid to aid in grinding and also to preheat and initially seed the garbage.

The garbage is discharged from the grinder 116 into the grit separation basin 117 where, with the aid of digester liquor withdrawn from the sewage sludge digester 120 and supplied to the basin 117 through the branch conduit 173, at least some of the non-digestible heavy solids are settled out, such solids being withdrawn through the discharge conduit 119. At the same time, the garbage in the grit separation basin is further heated and seeded by the digester liquor therein.

The garbage is passed from the grit separation basin 117 through the conduit 118 and into garbage digester 110 where it undergoes anaerobic decomposition. The temperature and digesting conditions of the garbage mass in the garbage digester 110 are maintained so as to insure anaerobic digestion of the garbage therein and preferably at the optimum rate, such conditions being maintained by the continual supply of heated digester liquor withdrawn from the sewage digester 120 and introduced into the garbage digester 110 through the grit separation basin 117, or the grinder, or both.

Overflow liquor or effluent from the garbage digester 110 is returned to the sewage sludge digester 120, overflow device 176 and the conduit 177. Digested garbage residue is withdrawn from the garbage digester 110 through the discharge conduit 190.

Raw sewage sludge is introduced into the sewage sludge digestion portion of the system through the inlet conduit 138 and preferably is admixed with digester liquor withdrawn from the sewage sludge digester 120 through the conduit 131, the mixture being passed through the heater 126 where it is heated and, thereafter, is passed into the primary sewage sludge digester 120 through the branch conduits 134 or 135, or both.

Preferably raw sewage sludge is admitted to the system as received during a portion only of each 24 hour period, during which time it is admixed with the withdrawn liquor and the mixture heated and delivered to the primary sewage sludge digester 120. During the remainder of the period, the withdrawn liquor is heated and returned to the primary sewage sludge digester 120 to maintain the contents at the optimum temperature for digestion.

The best digested sludge and the clearest digester liquor are withdrawn from the primary sewage sludge digester 120 through the conduit 155 and supernatant selector 150, respectively, and are passed through the conduit 151 and into the secondary sewage sludge digester 121, where the sludge is subjected to further digestion. Substantially completely digested sludge is withdrawn from the secondary sewage sludge digester 121 through the withdrawal conduit 156 and delivered to a point of disposal through the conduit 157. Digester liquor is withdrawn from the secondary digester 121 through the supernatant selector 158, or the overflow control device, or both, and delivered to a point of disposal through the discharge conduit 159, this being the sole point of withdrawal of effluent from the system.

As seen from the above, one portion of the digester liquor withdrawn from the primary sewage sludge digester is passed to the garbage digester and the remaining portion preferably is admixed with the raw sewage sludge during admission of the latter to the system and the mixture heated and returned to the primary sewage sludge digester, the withdrawn material, only, being circulated and heated during periods when no raw sewage sludge is being admitted to the system. The division of the withdrawn liquor into such portions may be controlled by the valves 143 and 175 to promote the best operation of the system. For example, if the raw sewage sludge and the raw garbage are admitted into the system during different periods, it probably will be found desirable to increase the proportion of recirculated liquor during periods of raw sewage sludge admission and to increase the proportion of liquor supplied to the garbage digester during periods of admission of garbage. Other variations in conditions in the various portions of the system may dictate other divisions of the withdrawn liquor.

I have found that in certain cases the efficiency of the system may be substantially increased and improved end products obtained by providing a multi-stage digestion of the sewage sludge and by withdrawing digester liquor from a secondary stage in the sewage sludge digestion for supply to the garbage digester, such liquor being in better condition than the liquor in the primary stage of the sewage sludge digestion. Moreover, a further increase in the efficiency of the process and, particularly, the sewage sludge digestion, may be effected by withdrawing for admixture with the raw sewage sludge, digester liquor from the secondary sewage sludge digester, which is admixed with the raw sewage sludge, the mixture being delivered to the primary sewage sludge digester.

A system embodying the foregoing features is shown in Fig. 4 of the drawings, the system being similar to the system shown in Fig. 2 of the drawings, except as will appear hereinafter. It will be understood that the apparatus embodied in the system may be generally similar to that shown in Figs. 3A and 3B except for an additional secondary digester and slightly different connections, as shown in Fig. 4.

Garbage is introduced into a garbage grinder 216 from which it passes into a grit separation basin 217 and thence to a garbage digester 210 for anaerobic digestion therein. A plurality of sewage sludge digesters including a primary digester 220, a first secondary digester 291 and a second secondary digester 221 are provided. Raw sewage sludge is introduced into the system through an inlet conduit 233 and preferably is mixed with liquor circulated from the first secondary digester 291 through a withdrawal conduit 231 leading from the first secondary digester 291 and connected to a return conduit 232 leading into the primary digester 220. Mixed raw sewage sludge and withdrawn digester liquor preferably are passed through a heater 226 in a manner similar to that above described in connection with the system of Fig. 2, where they are suitably heated before being passed to the primary sewage sludge digester 220 although the recirculating withdrawn sludge, or the mixture of withdrawn sludge and raw sewage sludge, may by-pass the heater as above described. The operation of the heater 226 is controlled by a gas inlet valve 230 under control of a thermostatic bulb 229 responsive to the temperature of the material passing into the heater coil.

The best liquor in the primary digester 220 is passed to the first secondary digester 291 by a conduit 250 which may lead from a supernatant selector (not shown) and the best digested sludge from the primary sewage sludge digester 220 is passed to the first secondary digester 291 through a conduit 252. The best liquor is passed from the first secondary digester through a conduit 293 to the second secondary digester 221, and the best digested sludge is passed from the first secondary digester 291 to the second secondary digester 221 through a conduit 294.

Excess or overflow liquor is withdrawn from the system at the second secondary digester 221 through a withdrawal conduit 259 and digested sludge is withdrawn from the system at the second secondary digester through the discharge conduit 257. It will be understood, of course, that discharge conduits (not shown) may be provided for withdrawing digested sludge directly from the first secondary digester 291, if desired, and even from the primary digester 220.

Digester liquor from the first secondary digester 231 is continually circulated through a conduit 270 having a circulation pump 274 therein, and connected to an inlet conduit 271 leading to the garbage digester. The circulated digester liquor preferably is passed through a heater 280 where additional heating of such liquor is effected. This heater 280 is controlled by a gas control valve 287 controlled by a thermostatic bulb 286 in the conduit 277. The digester liquor from the first secondary digester is discharged from the conduit 271 through branch conduits 272 and 273 in controlled quantities into the garbage grinder 216 and into the grit separation basin 217, as above described.

Excess liquor or effluent from the garbage digester 210 is returned to the primary sewage sludge digester 220 through an overflow control device 276 and conduit 277. Residue which settles to the bottom of the garbage digester 210 is withdrawn through an outlet conduit 290.

From the foregoing it will be seen that my invention provides a novel method and apparatus for disposing of garbage by anaerobic decomposition which is highly efficient and which permits the disposal of such garbage along with the treatment of sewage, with a minimum capacity of apparatus and a minimum expense of operation.

The continued addition to the digesting garbage of actively digesting material evolved from the anaerobic digestion of sewage sludge at a sufficient rate to maintain anaerobic digestion overcomes the strong tendency of the garbage toward acid fermentation, thereby preventing the difficulties and disadvantages which would otherwise result were the garbage allowed to go to acid fermentation. The added, actively digesting, material not only provides the desired organisms for digestion of the garbage but, being alkaline, aids in preventing the digesting mass of garbage from going acid. In addition, the continuous re-circulation of actively digesting material from the sewage sludge digestion zone has a tendency to make up at least some of the nitrogen deficiency of the garbage, which nitrogen is necessary to the support of the bacterial growth responsible for the destruction of garbage.

The garbage undergoing digestion is maintained in a garbage digestion zone separated and distinct from the sewage sludge digestion zone and thus the non-digestible solids usually contained in garbage and which would tend to clog the system are prevented from entering the sewage sludge digestion portion of the system and are retained in the garbage digester from which they may be readily removed with a minimum of difficulty. Moreover, the present invention provides for initial removal of a substantial portion of heavy, non-digestible solids from the garbage even before it is introduced into the garbage digestion zone, such removal being accomplished simply and inexpensively and without the necessity for introducing into the system any water or other liquid from outside of the system.

The return of the effluent from the garbage digestion zone to the sewage digestion portion of the system for further treatment prior to disposal accomplishes the further digestion of the organic matter in such effluent, with a consequent reduction in the strength of the liquor so that such liquor is in condition for disposal with the further treatment and, consequently, may be disposed of in the same manner as, and along with, the excess liquor evolved from the digestion of sewage sludge. Since the effluent from the garbage digestion zone is returned to the sewage sludge digestion portion of the system it may be subjected to any such further treatment as may be desirable or necessary without requiring the use of additional apparatus, it being necessary only to provide adequate capacity in the system.

The use of the digester liquor withdrawn from the sewage sludge digestion zone in the grinding of the garbage provides several very desirable advantages. The use of such liquor, which is already in the system, instead of introducing additional liquid from outside the system minimizes the total amount of liquid which must be handled by the system, thereby providing a larger effective capacity of the system for any particular size of apparatus. In addition, the liquor withdrawn from the sewage sludge digestion zone contains active organisms which are brought into contact with and intimately mixed with the ground garbage to initiate digestion at the earliest practicable point in the system, thus accelerating the digestion process and reducing the holding time of the material within the system. Furthermore, the warm digester liquor heats the cold raw garbage prior to introduction of the latter into the garbage digestion zone, which not only initiates early digestion and accelerates the digestion but also minimizes the cooling effect which would otherwise be produced by introducing cold garbage into the contents of the digestion zone. Thus, the introduction of liquor into the garbage during grinding contributes toward preventing cooling of the contents of the garbage digestion zone. In addition, the use of digester liquor withdrawn from the sewage sludge digestion zone for settling out the heavy non-digestible materials, further seeds and warms the raw ground garbage which adds to the beneficial results just mentioned in connection with the addition of the liquor with the garbage in the grinder.

By maintaining the contents of the sewage sludge digestion zone at a substantially uniform temperature and at the temperature which is optimum for digestion of the sewage sludge therein, the over-all efficiency of the system is improved and an effective increase in the total capacity of the system results. Thus, not only is the sewage sludge digested at the optimum rate, but strong and vigorous organisms are available at all times in the sewage sludge digestion zone for withdrawal and delivery to the garbage digestion zone to maintain the anaerobic digestion of the garbage.

The control of the temperature of the digesting material in the digestion zones is automatic, such temperature being controlled rather closely by the automatic operation of the heaters. Accordingly, optimum digestion may be substantially maintained even where the raw sewage sludge or the raw garbage, or both are supplied to the system at irregular intervals and in widely varying quantities. Moreover, the system is not only very flexible under automatic operation, but may be adjusted or controlled by the operation to meet a large number of differing conditions which may be met in practice.

The present invention permits the utilization of an existing sewage disposal system or plant for the digestion of garbage by the mere addition of a garbage digester and its associated apparatus, as described, with appropriate means for connecting the garbage digester and the sewage disposal system. Moreover, the accelerating of the digestion of the garbage, as explained above, permits the digestion of the garbage along with the sewage sludge without greatly increasing the load on the sewage disposal system and thus, without greatly decreasing the effective capacity of the sewage disposal system available for disposing of sewage.

It has been found that the present invention provides, in some cases, improved operation of the sewage sludge treatment portion of the system. The reasons for this are not fully understood but it is believed that it may be due to the fact that increased quantities of colloidal matter are supplied to the sewage sludge digester by the circulation of digester liquor to the garbage digester and return of digester liquor to the sewage sludge digester. The resultant increase in colloidal matter in the sewage sludge digester is believed to cause an increase in the gas-forming activity in the sewage sludge digester resulting in increased digestive action therein.

Where the terms "digester liquor," "liquor of digestion," "actively digesting material," are used herein they are employed, as in the art, to designate material such as that comprising the portion of the contents of a digester which contains organic material undergoing digestion, including solid, gas-lifted particles in suspension, solids in solution, and liquids, as contrasted with the solids in the digester which have undergone digestion and which consequently settle to the bottom of the digester.

I claim:

1. The method of digesting sewage sludge and garbage simultaneously which comprises the steps of feeding sewage sludge to a digestion zone substantially sealed against the admission of air for anaerobic digestion therein, feeding garbage to a digestion zone separated and distinct from said sewage sludge digestion zone and substantially sealed against the admission of air for anaerobic digestion therein, withdrawing digester liquor from said sewage sludge digestion zone, continually supplying such withdrawn digester liquor to said garbage digestion zone at a rate sufficient to maintain anaerobic digestion of the garbage in said garbage digestion zone, heating said withdrawn liquor of digestion to a temperature whereby when such heated liquor is mixed with the contents of the garbage digestion zone the temperature of said contents is approximately the optimum for digestion, returning overflow digester liquor from said garbage digestion zone to said sewage sludge digestion zone for remixture with and conditioning similarly to the digester liquor in said sewage sludge digestion zone, discharging overflow liquor and digested sludge from said sewage sludge digestion zone, and discharging non-digestible residue from said garbage digestion zone.

2. The method of digesting sewage sludge and garbage simultaneously which comprises the steps of feeding sewage sludge to a digestion zone substantially sealed against the admission of air for anaerobic digestion therein, feeding garbage in the ratio of 1.0 part of garbage (dry weight, volatile solids basis) to from around 1.36 to around 0.7 parts of sewage sludge (dry weight, volatile solids basis) to a digestion zone separated and distinct from said sewage sludge digestion zone and substantially sealed against the admission of air for anaerobic digestion therein, withdrawing digester liquor from said sewage sludge digestion zone, heating said withdrawn material, continually supplying such heated withdrawn digester liquor to said garbage digestion zone at temperatures and at a rate sufficient to maintain substantially optimum anaerobic digestion of the garbage in said garbage digestion zone, returning overflow digester liquor from said garbage digestion zone to said sewage sludge digestion zone for further digestion, discharging overflow liquor and digested sludge from said sewage sludge digestion zone, and discharging digested sludge from said garbage digestion zone.

3. The method of digesting garbage which comprises the steps of feeding ground garbage to a zone substantially sealed against the admission of air for decomposition of the garbage therein, feeding sewage sludge to a zone separated and distinct from said garbage digestion zone and substantially sealed against the admission of air for anaerobic decomposition of the sewage sludge therein, continually withdrawing liquor of digestion from said sewage sludge digestion zone, continually passing liquor of digestion withdrawn from said sewage sludge digestion zone to said garbage digestion zone at a rate sufficient to promote and maintain anaerobic digestion of the garbage in said garbage digestion zone, heating said withdrawn liquor of digestion to a temperature whereby when such heated material is mixed with the contents of the garbage digestion zone, the temperature of such contents is approximately the optimum for digestion, and passing liquor of digestion from said garbage digestion zone to a point of further digestion prior to disposal.

4. The method of digesting garbage which comprises the steps of feeding garbage to a zone substantially sealed against the admission of air for decomposition of the garbage therein, feeding sewage sludge to a zone separated and distinct from said garbage digestion zone and substantially sealed against the admission of air for anaerobic decomposition of the sewage sludge therein, continually withdrawing liquor of digestion from said sewage sludge digestion zone, heating said withdrawn liquor to approximately the optimum temperature for digestion of said garbage, continually passing said heated withdrawn liquor of digestion to said garbage digestion zone at temperatures and at a rate sufficient to maintain the temperature of the digesting garbage in said garbage digestion zone substantially constant for promoting and maintaining optimum anaerobic digestion of the garbage in said garbage digestion zone, returning liquor of digestion from said garbage digestion zone to said sewage sludge digestion zone where it is commingled with the digesting sewage sludge therein for further digestion therewith, and passing the finally digested liquor from the sewage sludge digestion zone to a point of disposal.

5. The method of digesting sewage sludge and garbage simultaneously which comprises the steps feeding ground garbage to a zone substantially sealed against the admission of air for decomposition of the garbage therein, feeding sewage sludge to a zone separated and distinct from said garbage digestion zone and substantially sealed against the admission of air for anaerobic decomposition of the sewage sludge therein, continually withdrawing liquor of digestion from said sewage sludge digestion zone, heating said withdrawn liquor to above the optimum temperature for digestion of said garbage and sewage sludge, continually passing at least a portion of said liquor of digestion to said garbage digestion zone for promoting and maintaining anaerobic digestion of the garbage in said garbage digestion zone and the remainder to said sewage sludge digestion zone for maintaining approximately the optimum temperature for digestion therein, returning liquor of digestion from said garbage digestion zone to said sewage sludge digestion zone where it is commingled with the digesting sewage sludge therein for further digestion therewith and to aid in the digestion of the sewage sludge therein, and passing the finally digested liquor from the sewage sludge digestion zone to a point of disposal.

6. The method of digesting garbage which comprises the steps of grinding garbage, feeding the ground garbage to a zone substantially sealed against the admission of air for decomposition of the garbage therein, feeding sewage sludge to a zone separated and distinct from said garbage digestion zone and substantially sealed against the admission of air for anaerobic decomposition of the sewage sludge therein, continually withdrawing liquor of digestion from said sewage sludge digestion zone, mixing at least some of said withdrawn liquor of digestion with said garbage to facilitate the grinding thereof, continually passing withdrawn liquor of digestion to said garbage digestion zone for promoting and maintaining anaerobic digestion of the garbage in said garbage digestion zone, heating said withdrawn liquor of digestion to a temperature whereby when such heated liquor is mixed with the contents of the garbage digestion zone the temperature thereof is approximately the optimum for digestion, passing liquor of digestion from said garbage digestion zone to a zone of further digestion for further digestion, and passing the finally digested liquor from such zone of further digestion to a point of disposal.

7. The method of digesting garbage which comprises the steps of feeding a mass of ground garbage to a zone substantially sealed against the admission of air for decomposition of the garbage therein, feeding sewage sludge to a two-stage zone including a primary stage and a secondary stage and separated and distinct from said garbage digestion zone and substantially sealed against the admission of air for two-stage, anaerobic decomposition of the sewage sludge therein, continually withdrawing liquor of digestion from the secondary stage of said sewage sludge digestion zone, continually passing said liquor of digestion to said garbage digestion zone for promoting and maintaining anaerobic digestion of the garbage in said garbage digestion zone, maintaining the temperature of the liquor of digestion passed to said garbage digestion zone at a temperature whereby when such liquor is mixed with the contents of the garbage digestion zone, the temperature of said contents is approximately the optimum for digestion, returning liquor of digestion from said garbage digestion zone to the primary stage of said sewage sludge digestion zone where it is commingled with the digesting sewage sludge therein for further digestion therewith, passing liquor of digestion from the primary to the secondary stage of said sewage sludge digestion zone, and passing the finally digested liquor from the secondary stage of the sewage sludge digestion zone to a point of disposal.

8. Apparatus for digesting garbage which apparatus comprises a closed digestion tank substantially sealed against the admission of air and adapted for the anaerobic digestion of garbage therein, means including an inlet conduit for passing garbage into said garbage digestion tank, a second closed digestion tank substantially sealed against the admission of air and adapted for the anaerobic digestion of sewage sludge therein, means including an inlet conduit for passing sewage sludge into said sewage sludge digestion tank, a withdrawal conduit leading from said sewage sludge digestion tank and connected to said garbage digestion tank for withdrawing digester liquor from said sewage sludge digestion tank, a pump connected in said withdrawal conduit for continually passing said digester liquor from said sewage sludge digestion tank to said garbage digestion tank, means including a heater in said withdrawal conduit, between said sewage sludge digestion tank and said garbage digestion tank for heating material withdrawn from said sewage sludge digester, means including a conduit leading from said garbage digestion tank to said sewage sludge digestion tank for returning overflow liquor from said garbage digestion tank to said sewage sludge digestion tank, means including a conduit for discharging overflow liquor from said sewage sludge digestion tank, and means including discharge outlets leading from said tanks for discharging digested sludge therefrom.

9. Apparatus for digesting garbage which apparatus comprises a closed digestion tank substantially sealed against the admission of air and adapted for the anaerobic digestion of garbage therein, means including an inlet conduit for passing garbage into said garbage digestion tank, a second closed digestion tank substantially sealed against the admission of air and adapted for the anaerobic digestion of sewage sludge therein, means including an inlet conduit for passing raw sewage sludge into said sewage sludge digestion tank, means providing with said digestion tank a closed continuous circulation system and including a withdrawal conduit leading from said sewage sludge digestion tank and connected to said garbage digestion tank for withdrawing digester liquor from said sewage sludge digestion tank, a pump connected in said circulation system for continually passing said digester liquor from said sewage sludge digestion tank to said garbage digestion tank, means including a heater in said withdrawal conduit, between said sewage sludge digestion tank and said garbage digestion tank for heating the material withdrawn through said withdrawal conduit, and means including a return conduit leading from said garbage digestion tank to said sewage sludge digestion tank for returning overflow liquor from said garbage digestion tank to said sewage sludge digestion tank, means including a conduit for discharging overflow liquor from said sewage sludge digestion tank, and means including discharge outlets leading from said tanks for discharging digested sludge therefrom.

10. Apparatus for digesting garbage which apparatus comprises a grinder for grinding garbage, a first closed digestion tank substantially sealed against the admission of air and adapted for anaerobic digestion of garbage therein, means including an inlet conduit for passing ground garbage from said grinder to said first digestion tank, a second closed digestion tank substantially sealed against the admission of air and adapted for the anaerobic digestion of sewage sludge therein, means including an inlet conduit for passing sewage sludge into said sewage sludge digestion tank, means providing with said digestion tanks a closed continuous circulation system and including a withdrawal conduit leading from said sewage sludge digestion tank and connected to said garbage digestion tank and to said grinder for withdrawing digester liquor from said sewage sludge digestion tank, a pump connected in said circulation system for continually passing said liquor from said garbage digestion tank to said sewage sludge digestion tank and for passing said liquor to said grinder at least when garbage is being ground, means including a heater in said withdrawal conduit, between said sewage sludge digestion tank and said garbage digestion tank for heating the material withdrawn through said withdrawal conduit, and means including a return conduit leading from said garbage digestion tank to said sewage sludge digestion tank for returning overflow liquor from said garbage digestion tank to said sewage sludge digestion tank, means including a conduit for discharging overflow liquor from said sewage sludge digestion tank, and means including discharge outlets leading from said tanks for discharging digested sludge therefrom.

11. Apparatus for digesting garbage and sewage sludge simultaneously which apparatus comprises a closed digestion tank substantially sealed against the admission of air and adapted for the anaerobic digestion of garbage therein, means including an inlet conduit for passing garbage into said garbage digestion tank, closed primary and secondary tanks substantially sealed against the admission of air and adapted for the anaerobic digestion of sewage sludge therein, means including an inlet conduit for passing sewage sludge into said primary sewage sludge digestion tank, means providing with said digestion tanks a closed continuous circulation system and including a withdrawal conduit leading from said secondary sewage sludge digestion tank and connected to said garbage digestion tank and said secondary sewage sludge digestion tank, a pump connected in said circulation system for continually passing digester liquor from said secondary sewage sludge digestion tank to said garbage digestion tank and to said primary sewage sludge digestion tank respectively, means including a heater in said withdrawal conduit, between said secondary sewage sludge digestion tank and said garbage digestion tank for heating material withdrawn through said withdrawal conduit and passed to said garbage digester and said sewage sludge digester, and means including a conduit leading from said garbage digestion tank to said primary sewage sludge digestion tank for returning overflow liquor from said garbage digestion tank to said primary sewage sludge digestion tank, means including a conduit for discharging overflow liquor from said secondary sewage sludge digestion tank, and means including discharge outlets leading from said digestion tanks for discharging digested sludge therefrom.

HARRY E. SCHLENZ.

REFERENCES CITED

The following references are of record in the file of this patent:

UNITED STATES PATENTS

| Number | Name | Date |
|---|---|---|
| 1,838,474 | Buswell et al. | Dec. 29, 1921 |
| 1,892,681 | Rankin | Jan. 3, 1933 |
| 1,912,595 | Schlenz | June 6, 1933 |
| 1,954,625 | Hellstrom | Apr. 10, 1934 |
| 2,008,839 | Samson | July 23, 1935 |
| 2,029,702 | Buswell et al. | Feb. 4, 1936 |
| 2,035,447 | Altick | Mar. 31, 1936 |
| 2,246,224 | Streander | June 17, 1941 |
| 2,409,585 | Piatt | Oct. 15, 1946 |
| 2,458,431 | Schlenz | Jan. 4, 1949 |
| 2,516,076 | Schlenz | July 18, 1950 |